Nov. 22, 1966 LIN KAO ETAL 3,287,493

COLOR DEMODULATOR

Filed Aug. 21, 1964

Inventors
LIN KAO &
LEONARD DIETCH
By Nicholas A Camasto
Atty

United States Patent Office 3,287,493

Patented Nov. 22, 1966

3,287,493
COLOR DEMODULATOR

Lin Kao, Evanston, and Leonard Dietch, Skokie, Ill., assignors to Admiral Corporation, Chicago, Ill., a corporation of Delaware Filed Aug. 21, 1964, Ser. No. 391,206
10 Claims. (Cl. 178—5.4)

This invention relates to demodulators. More particularly, it relates to synchronous demodulators used to extract modulation information from received signals.

While the invention will be described in the environment of the color demodulation section of a color television receiver, it will be understood that this is merely for convenience in its description and that the invention is not to be so limited.

A compatible color television signal contains luminance (brightness) information and color (hue and saturation) information. "Hue" denotes the actual color being televised, "saturation" denotes the relative whiteness of the color (e.g. pure red as opposed to pink), and "brightness" denotes the intensity of the light being reproduced, that is, its location in a scale wherein light (white) is at one extreme, and dark (black) is at the other.

A conventional color television camera "sees" only the red, blue and green components of the scene being televised. These three colors, the so called "primary colors", were chosen because almost the entire spectrum of perceptible colors can be reproduced by combining various proportions of these three colors, the combination referred to being a combination of light output, not of pigments.

The luminance information contained in a color television signal is obtained by matrixing 30% of the red, 11% of the blue and 59% of the green which is "seen" by the color television camera. This matrixing approximates the output of a monochrome television camera viewing the same scene and, therefore, the luminance information contained in a color television signal, when applied to a monochrome picture tube, will reproduce the original color scene in black and white.

The color reproduced upon the screen of a conventional three-gun color picture tube is determined by the amount of voltage applied to the control elements of each of three electron guns. For convenience, these electron or color guns are referred to as the red gun, the blue gun and the green gun. Each of the color guns activates corresponding color phosphors on the screen of the color picture tube. The tri-color phosphor screen and its associated shadow mask, as well as the details of mechanically prealigning the color guns and providing convergence of the electron beams, are well known in the art.

The luminance signal is conventionally applied to the cathode of each of the color guns and coacts with the voltage upon the grid of each gun to produce signals proportional to the amount of each of the three primary colors which is to be reproduced.

The signals impressed upon the grids of the color guns, when combined with the luminance signal on the cathodes, must result in a signal representative of the actual color to be reproduced. For this reason, in a conventional system, the signals coupled to the grids of the color guns are color difference signals. The color difference signals are commonly referred to as R–Y, B–Y and G–Y, where R, B and G represent, respectively, the red, blue and green color signals and Y represents the luminance signal.

The color information is amplitude modulated upon a color subcarrier as two coded color signals, which signals are phase displaced one from the other. The color subcarrier is 3.58 mc. higher in frequency than the picture carrier. This 3.58 mc. color subcarrier is suppressed at the transmitter and must be reinserted at the receiver in order to retrieve the color information. Short bursts of 3.58 mc. signal are transmitted with the video information to enable a local color subcarrier oscillator to lock in, in proper phase, with the color subcarrier at the transmitter.

Although the color guns of the color picture tube receive red, blue and green color difference signals, the color information is transmitted, for reasons which are not pertinent to this discussion, as coded I and Q signals, the color difference signals being derived within the color television receiver. The I and Q signals and the luminance signal are related to the primary color signals by the following equations:

$$Y=0.3R+0.59G+0.11B \quad (1)$$
$$I=0.6R-0.32B-0.28G \quad (2)$$
$$Q=0.21R+0.31B-0.52G \quad (3)$$

Equations 2 and 3 show that I and Q are both functions of R, B and G. The I signal modulates the color subcarrier, delayed in phase by 57°, and the Q signal modulates this subcarrier 90° later. Since the I and the Q signals are definite functions of the primary color signals, using the I and Q signals to modulate the color subcarrier does not preclude extracting different signals within the receiver. This is effected by varying the axes of demodulation. By proper selection of the relative phase of the reference signal (i.e., the reconstituted subcarrier) for demodulation, either the I and Q signals, or any other set of signals can be recovered, which signals may then be matrixed to produce R–Y, B–Y and G–Y color difference signals.

In accordance with the invention, the red, blue and green color difference signals are obtained from the demodulator and directly applied to the picture tube color guns.

The invention discloses means whereby the red and the blue color difference signals are derived directly from the anodes of the color demodulator tubes, which signals are then matrixed and reapplied to the tubes to produce the green color difference signal at the screen electrodes thereof. The relationship of the green color difference signal to the red and blue color difference signals is obtained by solving Equation 1 for G–Y, which results in the following:

$$G-Y=-0.509(R-Y)-0.187(B-Y) \quad (4)$$

Consequently, it is an object of this invention to provide an improved color demodulator for color television receivers.

Another object of this invention is to provide a novel synchronous demodulator which will simultaneously demodulate for a first and a second signal and amplify a third signal.

A further object of the invention is to provide synchronous demodulator means for obtaining two color difference signals directly from a color subcarrier and for amplifying a third color difference signal derived therefrom, using a single twin pentode as the synchronous demodulator and feedback amplifier.

A still further object of the invention is to provide an improved synchronous demodulator which develops red, blue and green color difference signals of sufficient amplitude to directly drive the respective color guns of a color picture tube, wherein a portion of the demodulator is used as a reflex type amplifier.

A further object of the invention is to provide an improved synchronous demodulator which will obviate the necessity of frequent adjustment of the grey scale.

Further objects of the invention will become evident to those skilled in the art by reading the specification in conjunction with the drawing in which.

Figure 1:
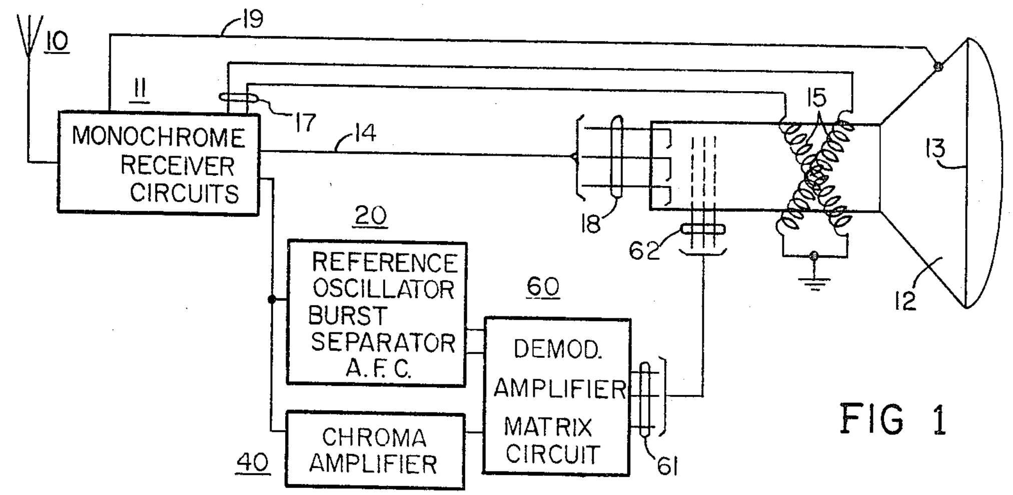
FIGURE 1 is a block diagram of a color television receiver.

Referring now to FIGURE 1, a block diagram of a color television receiver is shown. Since the majority of the circuitry of a color television receiver is functionally identical to the circuitry of a monochrome receiver, this diagram has been simplified by combining these common circuits in a block 11, which is labelled Monochrome Receiver Circuits. Block 11 is therefore essentially a monochrome television receiver, with appropriate leads running to a picture tube.

Antenna 10 couples received television signal transmissions to block 11, wherein is found circuitry (not illustrated) for selecting a particular signal from among those received by antenna 10 and for heterodyning this signal with a locally generated signal to produce an intermediate frequency carrier signal. Circuits in block 11 also amplify the intermediate frequency signal and remove the video and synchronizing information contained therein. Further circuitry in block 11 detects and reproduces the audio signal contained within the received television signal.

The synchronizing information detected in block 11 is utilized to control various other portions of the circuitry of block 11 which develop the horizontal and vertical potentials necessary to scan the electron beams from each of three color guns across the face 13 of a picture tube 12, and for developing the high potential necessary to accelerate these electron beams within picture tube 12.

As has been stated, the usable video information in a monochrome television receiver consists entirely of brightness information, which information is identical to the luminance signal of a colorcast. The luminance signal, commonly referred to as the "Y" signal, is coupled to the cathodes 18 of the color guns of picture tube 12 over a lead 14. Different signal levels are applied to the different cathodes in accordance with the color makeup of the monochrome signal. Horizontal and vertical scan potentials developed within the circuitry of block 11 are applied to horizontal and vertical deflection coils 15 over a pair of leads 17. A lead 19 carries high voltage from block 11 to picture tube 12, where it is coupled through an internal connection (not shown) to beam accelerating electrodes (also not shown) in picture tube 12.

Blocks 20, 40 and 60, labelled Reference, Oscillator, Burst Separator, AFC; Chroma Amplifier; and Demodulator, Amplifier, Matrix Circuit, respectively, comprise the chrominance circuitry of the color television receiver of FIGURE 1. Block 20 supplies 3.58 mc. reference voltages to the demodulator portion of block 60. The 3.58 mc. reference signals, developed by a free running oscillator which is keyed in by the 3.58 mc. bursts in the received signal, are delayed by a predetermined amount to demodulate along predetermined axes.

Chroma amplifier 40 amplifies the coded color signal and applies it to block 60 for demodulation. The combined effects of the coded color signal and the aforementioned 3.58 mc. reference signals within block 60 produce two color signals at video frequencies, which signals are then matrixed in the matrix circuit of block 60 to produce the red, blue and green color difference signals. The color difference signals are then amplified in the amplifier section of block 60 and coupled, through separate leads 61, to respective ones of grids 62 of the color guns of picture tube 13.

Figure 2:
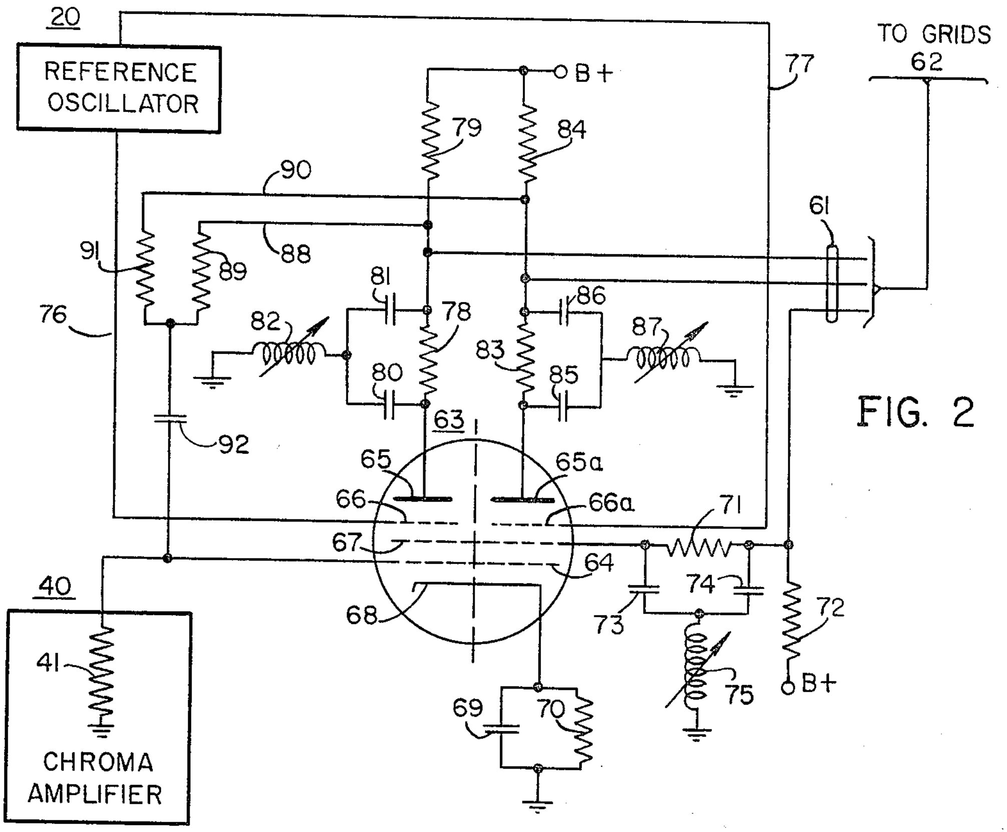
FIGURE 2 is a partial block and partial schematic diagram of the color demodulator portion of a color television set constructed in accordance with the invention.

FIGURE 2 is a partial schematic and partial block diagram of the chrominance circuitry of a color television receiver constructed in accordance with the invention. Chroma amplifier 40, the equivalent impedance of which is indicated by a resistor 41, applies the color signal to a common control grid 64 of a twin pentode 63. Twin pentode 63 also contains two anodes 65 and 65*a*, two suppressor grids 66 and 66*a*, a common screen grid 67 and a common cathode 68. Cathode 68 is coupled to ground through the parallel combination of a capacitor 69 and a resistor 70. Screen grid 67 is connected to B+ through a resistor 71 and a load resistor 72. Capacitors 73 and 74 are serially connected in parallel across resistor 71, their junction being connected to ground through a variable inductance 75. The combination of resistor 71, capacitors 73 and 74 and variable inductance 75 forms a trap which is tunable to 3.58 mc.

Anode 65 is connected to B+ through a resistor 78 and an anode load resistor 79. Capacitors 80 and 81 are serially connected in parallel across resistor 78, their junction being connected to ground through a variable inductance 82. Similarly, anode 65*a* is connected to B+ through a resistor 83 and an anode load resistor 84. Capacitors 85 and 86 are serially connected in parallel across a resistor 83 and their junction connected to ground through a variable inductance 87. This combination of elements also forms a trap tunable to 3.58 mc.

It should be understood that it is primarily for convenience and economy that a twin pentode is depicted as the color demodulator in this embodiment of the invention. The broader aspects of the invention obviously embrace not only twin pentodes but two single pentodes as well. This is indicated in FIGURE 2 by the horizontal dashed line running through twin pentode 63, dividing twin pentode 63 into a left and a right section. These sections can be considered either as two halves of a twin pentode, or as two separate pentodes. An added advantage of using a twin pentode in the preferred embodiment, is that constant resetting of the grey scale is thereby obviated, because tube characteristics vary with cathode aging and providing only one cathode assures more uniform tube characteristics. The invention represents a significant advance over prior art demodulators, many of which have as many as five separate vacuum tube cathodes, with the aging problems associated therewith.

In operation, two phase displaced 3.58 mc. reference signals are applied over leads 76 and 77 to suppressor grids 66 and 66*a*, respectively. In accordance with the invention, these reference signals are phase displaced from the color subcarrier and from each other by amounts which result in the direct demodulation of the red and the blue color difference signals.

The color information, which comprises two amplitude modulated (by the I and the Q signals) phase displaced suppressed carrier signals, is applied to common control grid 64 of twin pentode 63. The combined effect of the color information on control grid 64 and the reference signals on suppressor grids 66 and 66*a* produces an (R–Y) signal at anode 65 and a (B–Y) signal at anode 65*a*. These signals are conveyed over two of a group of three leads 61 and applied to respective grids 62 of the color guns of picture tube 12 with no further amplification.

In order that the demodulator of the invention produce a (G–Y) signal of sufficient amplitude for direct application to the grid of the green color gun of picture tube 12, a portion of the (R–Y) signal (taken from anode 65 over a lead 88 through a resistor 89) is matrixed with a portion of the (B–Y) signal (taken from anode 65*a* over a lead 90 through a resistor 91) and applied to control grid 64 through blocking capacitor 92. Cathode 68, control grid 64 and screen grid 67 now act as a triode amplifier which amplifies this externally fed-back signal and inverts its polarity. The values of resistors 89 and 91 are chosen such that, when taken in combination with resistance 41 (the equivalent resistance of chroma amplifier 40), the summation of signals on screen grid 67 is the equivalent of a (G–Y) signal. The amplified (G–Y) signal is coupled to a third one of grids 62 over a third one of leads 61.

The band width of the matrixed signal impressed upon control grid 64 is of the order of 0.5 mc. and does not interfere with the 3.58 mc. color subcarrier signal which is simultaneously impressed upon control grid 64.

In determining the relative phase angles of the reference signals on suppressor grids 66 and 66a, it must be remembered that these reference signals act as switches, passing only selected portions of the tube conduction current to anodes 65 and 65a. Those portions of the current which are prevented from reaching the anodes are effectively reflected back and captured by common screen grid 67, thus altering the screen current and the potential on common screen grid 67. This potential change contributes the first of two signals at anodes 65 and 65a. The second of these signals is occasioned by the momentary alteration of the control grid potential when the matrixed and proportioned (R–Y) and (B–Y) signals are reapplied for amplification. These signals may be considered as a —(B–Y) contribution to the (R–Y) signal at anode 65 and a —(R–Y) contribution to the (B–Y) signal at anode 65a.

Consequently, in order to obtain only (R–Y) and (B–Y) from the respective anodes, the phase angles of the reference signals are selected to demodulate for (R–Y) and an additional amount of (B–Y), and (B–Y) and an additional amount of (R–Y), respectively, where these additional amounts represent the —(R–Y) and —(B–Y) contributions mentioned above. In this way, these contaminating contributions are cancelled out, and only pure (R–Y) and (B–Y) are produced at their respective anodes.

In determining the values of resistors 89 and 91, it must also be remembered that the summation of the currents at the anode and screen grid of a pentode is equal to the cathode current (assuming no control grid or suppressor grid currents), and hence the appearance of a signal current in the circuit of anode 65 or 65a results in the appearance of a similar signal current of opposite polarity in the circuit of common screen grid 67. The opposite polarity is due to the fact that the summation of the instantaneous screen grid and anode currents are equal to the cathode current and if the anode current decreases (anode voltage rises) the screen current increases (screen voltage drops).

There is, then, an induced signal current in the circuit of screen grid 67 with components of —(R–Y) and —(B–Y), which must be considered when assigning values to resistors 89 and 91. The resistors are chosen such that the combination of the amplified signal and the induced signal current result in the equivalent of a (G–Y) signal in the circuit of screen grid 67.

What has been described is a novel synchronous demodulator which will detect two phase displaced signals from an amplitude modulated signal carrier and which will simultaneously amplify a third signal, which third signal is a derivative of the aforementioned two signals.

While the invention has been described with respect to the color demodulator of a color television receiver, it is understood that this represents the preferred embodiment thereof. Further, it is recognized that numerous modifications within the scope of the invention will suggest themselves to those skilled in the art. The invention is to be limited only by the appended claims.

The embodiments of the invention in which an exclusive property or privilege is claimed are as follows:

1. Demodulator means for demodulating a coded signal consisting of two phase displaced amplitude modulations of a suppressed carrier, said modulations including matrixed combinations of A information, B information and C information; said demodulator means including: a primary input circuit; two secondary input circuits; two primary output circuits and a secondary output circuit, means impressing a first signal on said primary input circuit; means impressing second and third signals on said secondary input circuits respectively; said first signal on the one hand and said second and third signals on the other hand coacting to accomplish demodulation of said A information and said B information, whereby said A information and said B information appear in respective ones of said primary output circuits; and means matrixing a portion of the output from said primary output circuits and coupling the resultant to said primary input circuit for amplification between said primary input circuit and said secondary output circuit to thereby yield said C information in said secondary output circuit.

2. Demodulator means including: a primary input circuit; two secondary input circuits; two primary output circuits and a secondary output circuit; means impressing a modulated signal on said primary input circuit, said modulated signal including amplitude modulated information on two different phases of a suppressed carrier, said information comprising matrixed combinations of signals A, B and C; means impressing demodulating signals on said secondary input circuits, respectively; means matrixing the output from said primary output circuits and coupling the resultant to said primary input circuit for amplification between said primary input circuit and said secondary output circuit; and means extracting said A and B signals respectively from said primary output circuits and said C signal from said secondary output circuit.

3. In an electronic apparatus, demodulator means for deriving a first, a second and a third signal from a received carrier signal, said third signal being derivable as a function of said first and second signals, said carrier signal being amplitude modulated by an A signal and a B signal, said A and B signals being phase displaced from one another, said demodulating means comprising; vacuum tube means having cathode means, control grid means, screen grid means, first and second suppressor grids and first and second anodes; means applying said carrier signal to said control grid means for synchronous demodulation; oscillator means applying reference signals to each of said first and second suppressor grids, said reference signals being phase displaced such that said first signal is produced at said first anode and said second signal is produced at said second anode; and matrixing means matrixing said first signal and said second signal and coupling said matrixed signals to said vacuum tube means for amplification, said third signal thereby appearing at said screen grid means.

4. In a color television receiver, a color demodulator including a single evacuated envelope having a common cathode, a common control grid, a common screen grid, first and second suppressor grids and first and second anodes; first means applying a color information signal to said common control grid, said color information signal comprising a first pair of related color signals amplitude modulated upon a suppressed subcarrier; oscillator means applying reference signals to each of said first and said second suppressor grids for synchronously demodulating said color information signal, said reference signals being phase displaced such that a second pair of related color signals is produced, one of said second pair of related color signals being produced at said first anode and the other one of said second pair of related color signals being produced at said second anode; and matrixing means applying a portion of each of said second pair of related color signals to said common control grid for amplification, thereby producing a third color signal at said common screen grid.

5. In a color television receiver, a color demodulator including a twin pentode vacuum tube having a common cathode, a common screen grid, first and second suppressor grids, and first and second plates; first means applying a color information signal to said common control grid, said color information signal comprising a suppressed subcarrier with amplitude modulations representing an I and a Q color signal; oscillator means applying reference signals to each of said first and said second suppressor grids for synchronously demodulating said color information signal, said reference signals being phase displaced such that an R–Y signal is produced at said first plate and a B–Y signal is produced at said second plate; and matrixing means applying a portion of said R–Y signal and a portion of said B–Y signal to said common control grid for amplification, thereby producing a G–Y signal at said common screen grid.

6. In a color television receiver, a color demodulator for deriving red, blue and green color difference signals, said color demodulator comprising a twin pentode vacuum tube having a common cathode, a common screen grid, first and second suppressor grids and first and second anodes; means applying a color information signal to said common control grid, said color information signal comprising a suppressed subcarrier with amplitude modulation representing first and second related color signals; means supplying bursts of synchronizing voltage of the same frequency as said suppressed subcarrier and with a predetermined phase relation to said suppressed subcarrier; oscillator means applying reference signals to each of said first and said second suppressor grids for synchronously demodulating said color information signal, said reference signals being controlled by said synchronizing voltage and being phase displaced from said suppressed subcarrier such that a red color difference signal is produced at said first anode and a blue color difference signal is produced at said second anode; and matrixing means applying a portion of said red color difference signal and a portion of said blue color difference signal to said common control grid for amplification, thereby producing a green color difference signal at said common screen grid.

7. A color demodulator as claimed in claim 6 wherein said matrixing means comprises a first resistive path connecting said first anode to said common control grid and a second resistive path connecting said second anode to said common control grid.

8. In a color demodulator: a twin pentode vacuum tube having a common cathode, a common control grid, a common screen grid, first and second suppressor grids and first and second anodes; means applying a color information signal to said common control grid, said color information signal comprising a suppressed subcarrier with amplitude modulations representing first and second related color signals; a first resistive path connecting said first anode to said common control grid and a second resistive path connecting said second anode to said common control grid, input signals from said first and said second resistive path causing a first voltage contribution at said first and second anodes, current reflection from said first and second suppressor grids to said common screen grid causing a second voltage contribution at said first and second anodes; oscillator means coupling a reference signal to each of said first and second suppressor grids for synchronous demodulation, said reference signals being phase displaced from said color subcarrier such that said first and second voltage contributions are cancelled out, a red color difference signal is produced at said second anode and a blue color difference signal is produced at said second anode; and matrixing means, including said first and second resistive paths, applying selected proportions of said red and blue color difference signals to said common control grid for amplification, thereby producing a green color difference signal at said common screen grid.

9. In a color television receiver, a color demodulator including: first and second pentode vacuum tubes, said first pentode vacuum tube having a first cathode, a first anode, a first control grid, a first screen grid and a first suppressor grid, said second pentode vacuum tube having a second cathode, a second anode, a second control grid, a second screen grid and a second suppressor grid; an input circuit common to said first and second control grids; an output circuit common to said first and second screen grids; means applying a color information signal to said common input circuit, said color information signal comprising a suppressed subcarrier with amplitude modulations representing a pair of related color signals; oscillator means applying reference signals to each of said first and said second suppressor grids for synchronously demodulating said color information signal, said reference signals being phase displaced from said color subcarrier such that a first color signal is produced at said first anode and a second color signal is produced at said second anode; matrixing means applying portions of said first and second color signals to said common input circuit; and means extracting a third color signal from said common output circuit.

10. In a color television receiver, a color demodulator including: a first and a second pentode vacuum tube, said first pentode vacuum tube having a first cathode, a first anode, a first control grid, a first screen grid and a first suppressor grid, said second pentode vacuum tube having a second cathode, a second anode, a second control grid, a second screen grid and a second suppressor grid; a first conductive path between said first and second control grids; a second conductive path between said first and said second screen grids; means applying a color information signal to said first and second control grids, said color information signal comprising a suppressed subcarrier with amplitude modulation representing an I and a Q color signal; oscillator means applying reference signals to each of said first and second suppressor grids for synchronously demodulating said color information signal, said reference signals being phase displaced from said suppressed subcarrier such that an R–Y signal is produced at said first anode and a B–Y signal is produced at said second anode; matrixing means applying a portion of said R–Y signal and a portion of said B–Y signal to said first and second control grids for amplification; and means extracting a G–Y signal from said first and second screen grids.

References Cited by the Examiner

UNITED STATES PATENTS

| | | | |
|---|---|---|---|
| 2,662,173 | 12/1953 | Van Wageningen et al. | 329—192 |
| 2,777,056 | 1/1957 | Bull | 329—192 |
| 2,990,445 | 6/1961 | Preisig | 178—5.4 |

DAVID G. REDINBAUGH, *Primary Examiner.*

J. A. O'BRIEN, *Assistant Examiner.*